United States Patent
Weber et al.

(10) Patent No.: US 10,246,266 B2
(45) Date of Patent: Apr. 2, 2019

(54) METHOD FOR CONTROLLING THE NORMAL FORCE OF A TRANSPORT UNIT OF A LONG STATOR LINEAR MOTOR

(71) Applicant: B&R INDUSTRIAL AUTOMATION GMBH, Eggelsberg (AT)

(72) Inventors: Andreas Weber, Salzburg (AT); Franz Spanlang, Linz (AT)

(73) Assignee: B&R INDUSTRIAL AUTOMATION GMBH, Eggelsberg (AT)

(*) Notice: Subject to any disclaimer, the term of this patent is extended or adjusted under 35 U.S.C. 154(b) by 0 days.

(21) Appl. No.: 15/926,334

(22) Filed: Mar. 20, 2018

(65) Prior Publication Data

US 2018/0273304 A1    Sep. 27, 2018

(30) Foreign Application Priority Data

Mar. 21, 2017    (AT) .............................. A 50226/2017

(51) Int. Cl.
*B65G 43/02*    (2006.01)
*B60L 13/03*    (2006.01)
(Continued)

(52) U.S. Cl.
CPC .............. *B65G 43/02* (2013.01); *B60L 13/03* (2013.01); *B60L 13/08* (2013.01); *B65G 54/02* (2013.01);
(Continued)

(58) Field of Classification Search
CPC .............................. B65G 17/002; B65G 43/02
(Continued)

(56) References Cited

U.S. PATENT DOCUMENTS 6,876,107 B2    4/2005    Jacobs
8,796,959 B2    8/2014    Sato
(Continued)

FOREIGN PATENT DOCUMENTS

AT    517219    12/2016
DE    4133114    4/1993
(Continued)

OTHER PUBLICATIONS

Austrian Office Action in A50226/2017 dated Feb. 7, 2018.
(Continued)

*Primary Examiner* — Gene O Crawford
*Assistant Examiner* — Lester Ill Rushin
(74) *Attorney, Agent, or Firm* — Greenblum & Bernstein, P.L.C.

(57) ABSTRACT

To reduce mechanical loading due to guidance of the transport unit of a conveyor installation in the form of a long stator linear motor and nevertheless ensure safe retention of the transport unit on the conveyor track of the conveyor installation in all operating conditions, the normal force ($F_{Nn}$) is controlled with a controller (Rk) for controlling the normal force ($F_{Nn}$). The controller (Rk) determines a normal-force-forming current component ($i_{And}$) of the drive current ($i_{An}$) of the drive coils interacting with the transport unit (Tn) so that a resulting normal force ($F_{\Sigma Nn}$) acting on the transport unit (Tn) as the sum of the normal force ($F_{Nn}$), a magnetic force ($F_{Mn}$) in the normal direction (N) caused by the drive magnets, and an external force ($F_{En}$) in the normal direction (N) acting on the transport unit (Tn) corresponds at least to a specified retaining force ($F_{Nnmin}$) in the normal direction (N).

7 Claims, 7 Drawing Sheets

(51) Int. Cl.
*B60L 13/08* (2006.01)
*B65G 54/02* (2006.01)
*H02P 25/064* (2016.01)
*H02P 6/00* (2016.01)

(52) U.S. Cl.
CPC ........ *H02P 25/064* (2016.02); *B65G 2203/02* (2013.01); *H02P 6/006* (2013.01)

(58) Field of Classification Search
USPC .............................................. 198/470.1, 617
See application file for complete search history.

(56) References Cited

U.S. PATENT DOCUMENTS

| | | |
|---|---|---|
| 2008/0115372 A1 | 5/2008 | Vogel |
| 2013/0074724 A1 | 3/2013 | King |
| 2015/0008768 A1 | 1/2015 | Achterberg |
| 2016/0380562 A1 | 12/2016 | Weber |

FOREIGN PATENT DOCUMENTS

| | | |
|---|---|---|
| DE | 10241471 | 3/2004 |
| DE | 1963505 | 12/2016 |
| EP | 2 634 913 | 9/2013 |
| EP | 3 109 998 | 12/2016 |
| GB | 1 247 257 | 9/1971 |
| WO | WO2004/103792 | 12/2004 |
| WO | WO2013/143783 | 10/2013 |

OTHER PUBLICATIONS

Khong, P.C. et al., "Magnetic Guidance of the Mover in a Long-Primary Linear Motor", IEEE Transactions on Industry Application, vol. 47, No. 3, May/Jun. 2011, pp. 1319-1327.

EPO Office Action/Search report in EP No. 18161643 dated Sep. 6, 2018.

METHOD FOR CONTROLLING THE
NORMAL FORCE OF A TRANSPORT UNIT
OF A LONG STATOR LINEAR MOTOR

CROSS-REFERENCE TO RELATED
APPLICATIONS

The present application claims priority under 35 U.S.C. § 119(a) of Austria Patent Application No. A50226/2017 filed Mar. 21, 2017, the disclosure of which is expressly incorporated by reference herein in its entirety.

BACKGROUND OF THE INVENTION

1. Field of the Invention

The present invention relates to a method for controlling a normal force acting on a transport unit of a conveyor installation in the form of a long stator linear motor on a track section of a conveyor track defined by the conveyor installation, on which track section drive coils of the long stator linear motor are provided on only one side of the transport unit and the transport unit is retained on the conveyor track on this side by guide elements.

2. Discussion of Background Information

In a long stator linear motor, a multiplicity of electrical drive coils, which form the stator, are arranged in a stationary manner next to one another along a conveyor track. Arranged on a transport unit is a number of drive magnets, either as permanent magnets or as an electrical coil or short-circuit winding, which interact with the drive coils. As a result of the interaction of the (electro)magnetic fields of the drive magnets and the drive coils, a forward-driving force, Which moves the transport unit forward, acts on the transport unit. The long stator linear motor can be designed as a synchronous machine, both self-excited and separately excited, or as an asynchronous machine. The magnitude of the forward-driving force is influenced by energizing the individual drive coils to control the magnetic flux, and the transport unit can be moved along the conveyor track in the required manner. At the same time, it is also possible to arrange a multiplicity of transport units along the conveyor track, the movements of which can be controlled individually and independently of one another by energizing the drive coils, usually by applying an electrical voltage, interacting with each transport unit. A long stator linear motor is distinguished in particular by a better and more flexible utilization over the whole working range of the movement (position, velocity, acceleration), individual regulation/control of the transport units along the conveyor track, an improved utilization of energy, the reduction of maintenance costs due to the lower number of wearing parts, simple replacement of the transport units, efficient monitoring and fault detection, and an optimization of the product flow along the conveyor track. Examples of such long stator linear motors can be found in WO 2013/143783 A1, U.S. Pat. No. 6,876,107 B2, US 2013/0074724 A1 or WO 2004/103792 A1

Basically, as a result of the magnetic flux generated by the drive coils, as well as the forward-driving force in the direction of movement of the transport unit, a normal force can also he generated perpendicular to the direction of movement. For this purpose—in a similar way to rotating electric motors—an electrical current with a current component in the direction of movement (often also referred to as the q-component) and a current component in the normal direction (that is to say perpendicular to direction of movement, often also referred to as the d-component) can be impressed on the active drive coils. The current component in the direction of movement is responsible for generating the forward-driving force. This is described, for example in Khong, P. C,, et al., "Magnetic Guidance of the Mover in a Long-Primary Linear Motor", IEEE Transactions on Industry Applications, .Vol.47, No.3, May/June 2011, P.1319-1327. Khong describes a long stator linear motor with drive coils arranged on both sides viewed in the direction of movement, and the normal forces on the two sides are used to center the transport unit for guiding centrally. To this end, a lateral set-point deviation of the transport unit from the center of zero is fed to the controller for the normal forces.

In a long stator linear motor with drive coils arranged on one side, the specific production of a normal force is, however, prevented in normal operation, as a d-component of the drive current does not give rise to a forward-driving force and therefore represents a loss or reduces the achievable forward-driving force for a given design. A normal force would therefore he disadvantageous with a design of this kind of the long stator linear motor. With a long stator linear motor with drive coils arranged on only one side, an attempt is therefore made to impress only a q-component of the drive current.

DE 1 963 505 A1 describes a linear induction motor which, in the region of a track switch, uses the normal force to move a transport unit at the track switch along either one or the other track section. Also, drive coils are provided on both sides in the region of the track switch in order to be able to guide the transport unit appropriately at the fork of the track switch. In doing so, the normal force at the track switch is reduced or entirely eliminated on one side, which causes a resulting transverse magnetic force. The normal force is therefore specifically generated or influenced in the region of the track switch in order to steer the transport unit at the track switch. However, along the other track sections, at which again drive coils are arranged on only one side, for the above-mentioned. reasons, an attempt is again made to prevent a normal force. Similar can also be found in EP 3 109 998 A1.

However, a transport unit must, of course, also be safely retained on the conveyor track so that it does not fall off when moving along the conveyor track. This applies particularly to track sections in which only a one-sided conveyor track (ort which the drive coils are also arranged) is provided. Elaborate mechanical guides to ensure reliable retention are conceivable here. At the same time, it is disadvantageous that such mechanical guides must be designed for the worst operating condition (loading, velocity, acceleration, position of transport unit, etc.). Guidance and retention is therefore complex and in most cases oversized. With simpler designs of the guiding of the transport unit on the conveyor track, a retaining force in the normal direction is usually required in order to reliably retain the transport unit on the conveyor track.

Running noises also occur due to the acting guide forces and the guides, and the transport units can also run unevenly, which, in turn, can lead to oscillations and vibrations. Running noises in particular become noticeable in a very unpleasant way, especially when considering large installations with many transport units.

The drive magnets of the transport unit interact with the iron parts of the stator of the long stator linear motor or the guide structure of the conveyor track and generate a magnetic force in the normal direction. This magnetic force can be seen as assisting the retaining force, but in many cases is not sufficient in itself to reliably retain the transport unit on the conveyor track in all operating states. Additional devices for guiding and retaining the transport unit must therefore be provided. These can be additional permanent magnets which are not used for driving or, additional mechanical guides or retaining devices. However, both again make the transport unit more complex. If, on the other hand, the magnetic force is too large, as a result of high friction forces due to the resulting high normal force, it can mechanically load the transport unit and/or the conveyor track, which can lead to increased wear.

The basic problem is, however, that the guidance of the transport unit on a track section with drive magnets arranged on only one side must always be designed for the worst operating condition in order to be able to retain the transport unit safely on the conveyor track at all times. This means high forces for guiding the transport unit, which mechanically load the transport unit and/or the conveyor track due to high friction forces, which can lead to increased wear and unpleasant vibrations and running noises.

SUMMARY OF THE EMBODIMENTS

Embodiments of the present invention specify a method for controlling a transport unit with which it is possible to reduce the mechanical loading due to the guidance of the transport unit and nevertheless ensure safe retention of the transport unit on the conveyor track in all operating conditions.

According to the invention, the method provides: that the normal force is controlled with a controller for controlling the normal force, wherein the controller determines a normal-force-forming current component of the drive current of the drive coils interacting with the transport unit so that a resulting normal force acting on the transport unit as the sum of the normal force, a magnetic force in the normal direction caused by the drive magnets, and an external force in the normal direction acting on the transport unit corresponds at least to a specified retaining force in the normal direction. By controlling the normal force (which is also understood to mean a simple open-loop control) the resulting normal three acting on the transport unit can be influenced so that the resulting force acting on the transport unit in the normal direction is never greater in magnitude than required and also never less than necessary. This enables the mechanical loading on the guide elements of the transport unit to be reduced, and running noises can also be reduced and the smooth running of the transport unit increased.

This can be achieved very easily by a feedforward control in that the controller for controlling the normal force determines the normal-force-forming current component of the drive current from a known functional relationship between the normal-force-forming current component of the drive current and a setpoint value of the control of the normal force. For this purpose, for example, a setpoint flux can be specified as the setpoint value of the control of the normal force, and the normal-force-forming current component can be calculated as the quotient of the setpoint flux and a known inductance in the normal direction, which can be implemented very easily.

On the other hand, the quality of the control can be increased when, in the controller for controlling the normal force, the normal-force-forming current component is determined from the difference of a setpoint value of the control of the normal force and an actual value of the control of the normal force by means of a normal-force controller.

Advantageously, in the controller for controlling the normal force a pilot current is determined by a pilot control from a setpoint value of the control of the normal force, and a control current is determined by a normal-force controller from the difference between the setpoint value of the control of the normal force and an actual value of the control of the normal force, and the normal-force-forming current component is determined as the sum of the pilot current and the control current. This enables unavoidable normal force variations to be effectively corrected, as a result of which the smooth running can be further increased. It is advantageous hereby when the pilot current is determined based on a known relationship of the position of the transport unit relative to the conveyor track, as this relationship can be easily determined.

The control of the normal force can easily be incorporated into a control of the movement of the transport unit in that a forward-force-forming current component is determined in a controller for controlling the forward force of the transport unit and a drive current of the drive coils interacting with the transport unit is determined as the vectorial sum of the forward-force-forming current component and the normal-force-forming current component and the drive current is converted into coil voltages which are applied to the drive coils interacting with the transport unit.

Other exemplary embodiments and advantages of the present invention may be ascertained by reviewing the present disclosure and the accompanying drawing.

BRIEF DESCRIPTION OF THE DRAWINGS

The present invention is explained in more detail below with reference to FIGS. 1 to 14, which show advantageous embodiments of the invention in an exemplary, schematic and non-restricting way. In the drawings

DETAILED DESCRIPTION OF THE EMBODIMENTS

Figure 1:
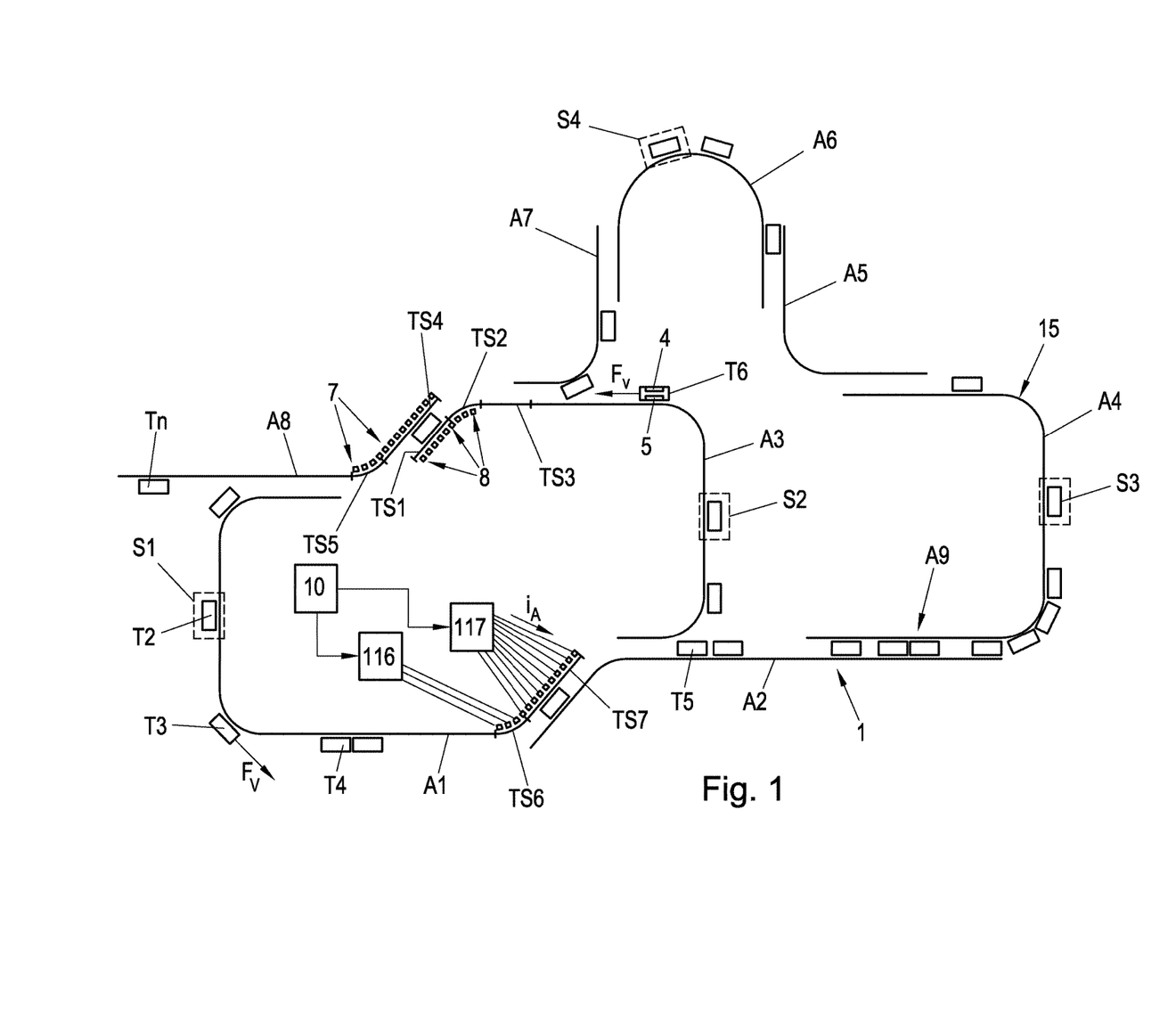
FIG. 1 shows an embodiment of a conveyor installation in the form of a long stator linear motor.

A conveyor installation 1 in the form of a long stator linear motor is shown by way of example in FIG. 1. The conveyor installation I consists of a number of conveyor segments TSk (here k is an index which represents all existing conveyor segments TS1, TS2, TS3, . . . ,), of which only the conveyor segments TS1 . . . TS7 are shown with reference numerals by way of example for reasons of clarity. A conveyor segment TSk is in each case arranged on one side of the conveyor track. The conveyor segments TSk form different track sections, for example a straight, bends with different angles and radii, track switches, etc,, and can be put together in a very flexible manner in order to form the conveyor track of the conveyor installation 1. Together, the conveyor segments TSk therefore form the conveyor track, along which the transport units Tn (here n is an index which represents all transport units T1, T2, T3, T4, . . . ) can be moved. This modular construction enables a very flexible design of the conveyor installation 1. The conveyor segments TSk are, of course, arranged on a stationary supporting structure which is not shown.

A number of workstations S1 . . . S4, in which manipulation of the components transported with the transport unit Tn takes place, can also be arranged along the conveyor track of the conveyor installation 1, which is substantially defined by the longitudinal direction of the conveyor segments TSk. For example, the workstation S1 can be designed as a charge and/or discharge station, in which ready processed components are removed and components to be processed are transferred to a transport unit In. Any prOcessing steps can be carried out on the components in workstations S2 . . . S4. The transport unitsIn can also be stopped in a workstation S1 . . . S4 for processing, e.g in a filling station, in which empty bottles are filled, or moved through, e.g. in a tempering station, in which components are heat-treated, if necessary also at a different velocity from between workstations S1 . . . S4.

Figure 2:
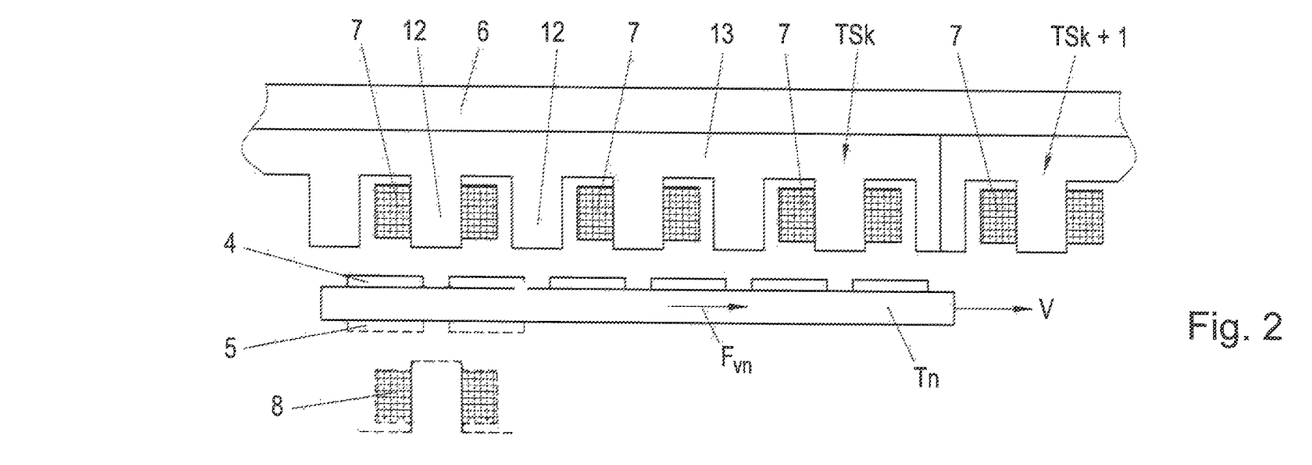
FIG. 2 shows a detail view of the design of the conveyor segments and the transport unit.

The conveyor installation J. is designed as a long stator linear motor, in which the conveyor segments TSk each form part of a long stator of the long stator linear motor in a manner which is known per se. In a known manner, a multiplicity of electrical drive coils 7, 8 forming the stator, which can interact with the drive magnets 4, 5 on the transport units T1 . . . Tn (for reasons of clarity shown only for the transport unit T6 in FIG. 1), are therefore arranged in a. stationary manner in the longitudinal direction along the conveyor segments TSk (for reasons of clarity shown only for the conveyor segments TS1. TS2, TS4, TS5, TS6, TS7 in FIG. 1). This is shown in detail in FIG. 2 by way of example. A drive magnet 4, 5 can be designed as an electromagnet (excitation coils) and/or as a permanent magnet. The drive coils 7, 8 are preferably arranged on teeth 12 of a ferromagnetic core 13 (for example, an iron laminated core). However, the drive coils 7, 8 can, of course, also be designed without a core. Because of this arrangement, it can also immediately be seen that, due to the changing magnetic resistance and due to the arrangement of the drive magnet 4, 5, the magnetic flux varies in the longitudinal direction along the conveyor segment TSk as a function of the position of the transport unit Tn.

Along the conveyor track, there can also be track sections, on which conveyor segments TSk are arranged on both sides and between which a transport unit Tn is moved (fhr example the conveyor segments TS1. TS4). When the transport unit Tn is fitted on both sides with drive magnets 4, 5 (viewed in the direction of movement), then the transport unit Tn can also simultaneously interact with the conveyor segments TSk arranged on both sides. This, of course, also enables a greater forward-driving force $F_{vn}$ to be generated. However, track sections, on which a conveyor segment TSk or drive magnets 7, 8 are provided on only one side, for example on conveyor segment TS5, are considered for the invention.

Figure 3:
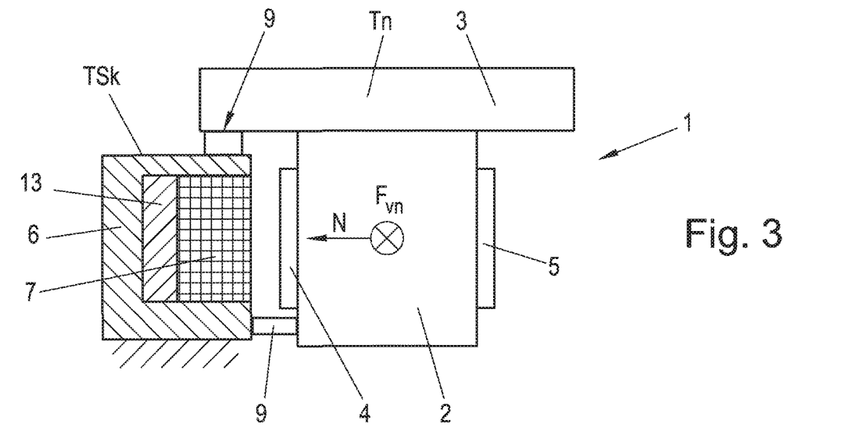
FIG. 3 shows a cross section in the normal direction at a point on the conveyor track.

FIG. 3 shows a cross section (transverse to the longitudinal direction) through such a track section with a conveyor segment TSk on one side of the conveyor track and a transport unit Tn moved thereon. However, the side on which a conveyor segment TSk or drive coils 7, 8 are arranged is irrelevant for the invention. Here, a transport unit Tn consists of a base body 2 and a component receptacle 3 arranged thereon, wherein the component receptacle 3 can basically be arranged at any point on the base body 2, in particular also on the underside for suspended components. The number of drive maanets 4 of the long stator linear motor is arranged on the base body 2 on the side of the transport unit Tn facing the conveyor segment TSk. As shown in FIG. 3, however, a number of drive magnets 5 can also be arranged on the opposite side. The conveyor segment TSk is arranged on a stationary supporting structure 6 or itself forms part of the stationary supporting structure 6. The drive coils 7, 8 of the long stator linear motor are arranged on the conveyor segment TSk or, more generally, on the conveyor track which is formed by the conveyor segments TSk. The transport unit Tn is designed such that the drive magnets 4 are arranged opposite the drive coils 7, so that the drive magnets 4 can interact with the drive coils 7 to generate a forward-driving force $F_{vn}$. The transport unit Tn can therefore be moved along the conveyor track in the forward direction V. Of course, guide elements 9, such as rollers, wheels, sliding surfaces, guide magnets, etc., are also provided on the transport unit Tn (only indicated here for reasons of clarity) in order to guide and retain the transport unit Tn along the conveyor track, particularly also at standstill. At the same time, for guidance, the guide elements 9 of the transport unit Tn interact with the conveyor track, e.g. the stationary supporting structure 6 or the conveyor segments TSk, for example in that the guide elements 9 are supported on, hook into, slide or roll on the conveyor track, etc. An air gap, which is adjusted and maintained, among other things, by the guide elements 9, is formed between the drive coils 7 and the drive magnets 4.

The drive magnets 4, 5 can also serve as, possibly additional, guide elements 9 in order to retain the transport unit Tn on the conveyor track. For example, the drive magnets 4 produce a magnetic attraction force on the ferromagnetic parts of the guide structure 6 and/or drive coils 7 (for example, an iron core). This magnetic force $F_{Mn}$ tries to pull the transport unit Tn towards the conveyor track and, by doing so, produces a retaining force in the normal direction N, which also fulfils a retaining function during the movement of the transport units Tn. In the case of a two-sided arrangement of drive magnets 4, 5 and drive coils 7, 8, the resulting magnetic attraction forces on both sides of the transport unit Tn can, of course, cancel one another.

By interacting with the conveyor track 15, the guide elements 9 of the transport unit Tn ensure that the transport unit Tn is retained on the conveyor track 15. When the conveyor installation 1 is operating, each transport unit Tn must at all times and in every operating condition be reliably retained on the conveyor track 15 at every point on the conveyor track 15. Depending on the structural design of the transport unit Tn and the conveyor track 15, in particular the guide elements 9, a minimum retaining force in the normal direction N is necessary to prevent the transport unit Tn from falling off the conveyor track. Preferably, the guide elements 9 and/or the components of the guide structure 6 which interact therewith are designed in a simple manner and serve to maintain the air gap and to absorb the acting normal forces and, in addition, retain a transport unit Tn at least at stand still and prevent the transport unit Tn from falling off the conveyor track. Usually, but not necessarily, this retaining force will pull the transport unit Tn towards the conveyor track 15. Here, "designed in a simple manner" means particularly that no large forces, which load the mechanical components of the conveyor track and/or the transport units Tn, for example by resulting friction, loads on bearings, guides, etc., or lead to loud running noises, are generated by these guide elements 9.

However, when the transport unit Tn is moved, an additional external force $F_{En}$ can act in the normal direction N on the transport unit Tn. An external force $F_{En}$ in the normal direction N can occur, for example, depending on the position of the transport unit Tn on the conveyor track (e.g. longitudinal or transverse inclination of the Conveyor track, bend, etc.) and/or depending on the current operating state of the transport unit Tn (e.g. velocity, acceleration, loading condition, etc.). For example, the external three is caused by acceleration forces or centrifugal forces in bends. These forces caused by the movement of the transport unit Tn can, of course, also be affected by the mass of the transport unit Tn and therefore, in particular, also by the loading of the transport unit Tn. If, for example, the transport unit Tn moves with a heavy load and at high velocity into a bend, large centrifugal forces act as an external force $F_{En}$, which can lead to the transport units Tn falling off the conveyor track in spite of the guide elements 9, which, of course, it is imperative to avoid during operation. Another example of the occurrence of external forces $F_{En}$ is a transport unit Tn which, for example, transports a liquid in a container. During movement, in particular acceleration, of the transport unit Tn, the liquid in the container can sway, wherein very considerable external threes $F_{En}$ can occur on the transport unit Tn. Asymmetric loading of the transport unit Tn can also cause external forces $F_{En}$ on the transport unit Tn when moving. Due to the external forces $F_{En}$ acting, the desired simple guide elements 9 may no longer be sufficient to safely retain the transport unit Tn on the conveyor track at all points on the conveyor track 15.

On the other hand, as already mentioned, a magnetic force $F_{Mn}$, which is caused by the drive magnets 4 When interacting with the ferromagnetic parts of the drive coils 7 and/or the conveyor segments TSk and/or the supporting structure 6, can also act on the transport unit Tn in the normal direction N. Usually, this magnetic force $F_{Mn}$ pulls the transport unit towards the conveyor track 15.

A resulting normal force $F_{\Sigma Nn}$ as the sum of all threes (with the appropriate sign) therefore acts on the transport unit Tn in the normal direction N. Depending on the direction of the resulting normal force $F_{\Sigma Nn}$ (towards the conveyor track 15 or away therefrom), the resulting normal force $F_{\Sigma Nn}$ can try to lift the transport unit Tn off the conveyor track 15 or pull it towards the conveyor track 15. In the case of a resulting normal force $F_{\Sigma Nn}$ directed away from the conveyor track 15, the transport unit Tn could, for example, fall off the conveyor track 15, which must, of course, be avoided in all cases. However, this resulting normal force $F_{\Sigma Nn}$ must in any event be absorbed by the guide elements 9. The guide elements 9 and/or the parts of the conveyor track 15 which interact therewith have theretofore previously been designed so that the transport unit Tn can always be safely retained on the conveyor track 15, whereby, in most cases, the guide elements 9 were greatly oversized. As a result however, the guide elements 9 and/or the part interacting therewith were also heavily loaded (for example by friction), as corresponding forces had to act in the normal direction N.

In order to be able to keep the guide elements 9 in a simple way, to be able to keep the loads on the guide elements 9 low and, in spite of this, to be able to retain the transport unit Tn safely on the conveyor track 15 in every situation, according to the invention it is now provided to control the normal force $F_{Nn}$ caused by the drive coil 7, 8 such that the resulting normal force $F_{\Sigma Nn}$ acting on the transport unit in corresponds to a specified necessary minimum retaining force $F_{Nnmin}$. This enables too high resulting normal threes $F_{\Sigma Nn}$ towards the conveyor track 15 or away therefrom to be compensated.

Figure 4:
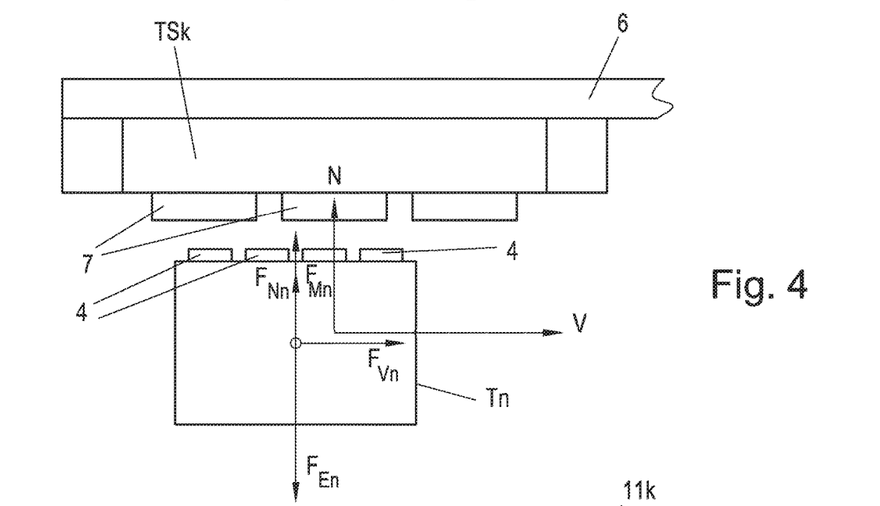
FIG. 4 shows an illustration of the forces acting on the transport unit in the normal direction.

This is explained with reference to FIG. 4. The forward-driving force $F_{Vn}$ acts on the transport unit Tn in order to move it in a forward direction V. In addition, a magnetic force $F_{Mn}$, which is caused by the drive magnets 4 when interacting with the ferromagnetic parts of the drive coils 7 and/or the conveyor segments TSk and/or the supporting structure 6, may also act in the normal direction N. An external force $F_{En}$ can act on the transport unit Tn depending on the position or the operating state of the transport unit Tn. By energizing the drive coils 7 which interact with the transport unit Tn with a d-component $i_{Ad}$ of the drive current $i_A$, a normal force $F_{Nn}$ additionally acts on the transport unit Tn. A resulting normal three $F_{\Sigma Nn}$ as the sum of all forces acting in the normal direction N, that is to say $F_{\Sigma Nn}=\Sigma(F_{Nn}, F_{Mn}, F_{En})$, therefore acts on the transport unit Tn, wherein the forces must of course be applied with the appropriate sign. This resulting normal force $F_{\Sigma Nn}$ must correspond in magnitude and direction at least with a specified retaining force $F_{Hnmin}$, that is to say $F_{\Sigma Nn} \geq F_{Hnmin}$. The specified retaining force $F_{Hnmin}$ is the force in the normal direction N which is required to retain the transport unit Tn safely on the conveyor track. As the structural design of the conveyor track, of the transport unit Tn and of the guide elements 9 is known, the required retaining force $F_{Hnmin}$ can be assumed to be known and given.

In this way, it is possible to specifically influence the resulting normal force $F_{\Sigma Nn}$ acting on the transport unit Tn by means of the normal force $F_{Nn}$. On a bend, the normal force $F_{Nn}$ can be generated, for example, as an external force $F_{Nn}$ in the opposite direction to the acting centrifugal force in order to reduce or even to compensate for the effect of the centrifugal forces. The effect of a swaying liquid can be estimated when planning the conveyor track 15 (where the type of load and the movement is planned in advance) and the normal force $F_{Nn}$ required to reduce or compensate for the external force $F_{En}$ can be generated at critical points (e.g, at points where accelerations act or can act). Along a straight section, or when no external forces $F_{Nn}$ act, the acting magnetic force $F_{Mn}$ can be partially cancelled by the normal force $F_{Nn}$ in order to reduce the load on the guide elements 9 by means of a reduced resulting normal force $F_{\Sigma Nn}$. This enables the mechanical load on the guide elements 9 and/or on the conveyor track to be reduced, which also has a positive effect on the life of the transport unit Tn or on the maintenance intervals. In addition, this also enables running noises and vibrations of the transport unit Tn to be reduced. This quite particularly advantageous application for specifically relieving the load on the guide elements 9 is explained, for example, with reference to FIG. 5.

Figure 5:
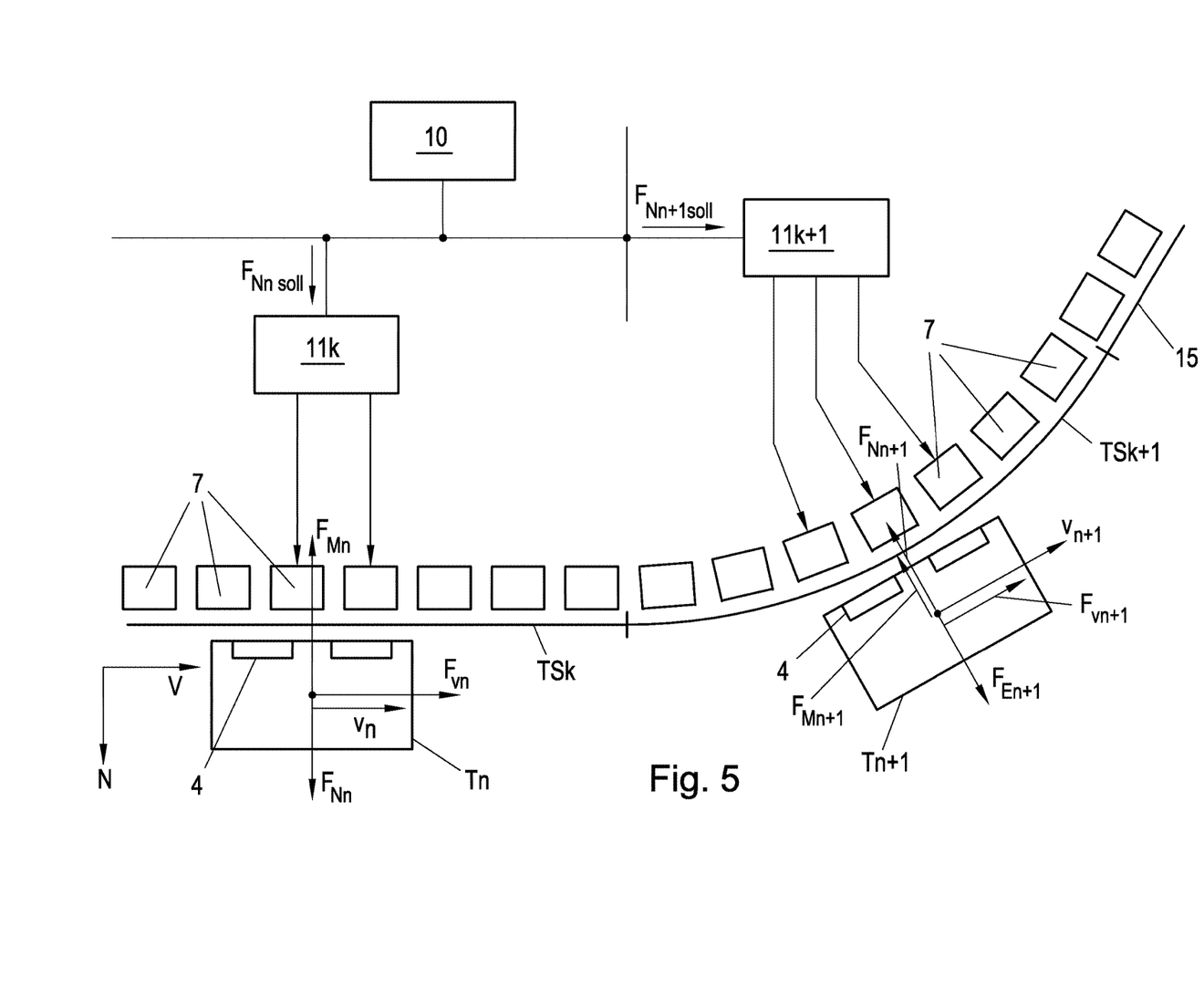
FIG. 5 shows an illustration of the forces acting on a transport unit in the normal direction at different points on the conveyor track.

Two transport units Tn, Tn+1 are moved along a conveyor track 15, which, in the exemplary embodiment shown, consists of two conveyor segments TSk, TSk+1. The first conveyor segment TSk is a straight track section. Located in this track section is the transport unit Tn, which here is moved at constant velocity $v_n$ in the direction of movement V (longitudinal direction of the conveyor track). The transport unit Tn is retained by guide elements 9 (not shown) on the conveyor track 15, that is to say on the conveyor segment TSk. A magnetic force $F_{Mn}$, which is generated by the drive magnets 4 on the transport unit Tn when interacting with the conveyor track 15 (for example, a permanent magnet attraction force), acts on the transport unit Tn. As an example, no external force $F_{En}$ acts in the normal direction N in this straight track section. Therefore, a normal force $F_{Nn}$, which reduces the magnetic force $F_{Mn}$ to relieve the load on the guide elements 9 and reduce the running noises, can be generated in this track section. In doing so, the normal force $F_{Nn}$ is adjusted such that the resulting normal force $F_{\Sigma Nn}$ (sum of the normal force $F_{Nn}$ and the magnetic force $F_{Mn}$) corresponds at least to the specified required retaining force $F_{Hnmin}$.

The following conveyor segment TSk+1 is designed as a bend. When a transport unit Tn+1 with a velocity $v_{n+1}$ travels through the bend, a centrifugal force, which tries to lift the transport unit Tn+1 off the conveyor segment TSk+1, acts on the transport unit Tn+1 as an external force $F_{En+1}$. Here, the normal force $F_{Nn+1}$ can now be used to reduce the effect of the centrifugal force and therefore to ensure an acting resulting normal force $F_{\Sigma Nn}$ (sum of the normal force $F_{Nn+1}$, the magnetic force $F_{Mn+1}$ and the external force $F_{En+1}$) which corresponds at least to the specified retaining force $F_{Hn+1min}$. If the centrifugal force is not too high, the normal force $F_{Nn+1}$ could also be used to further reduce a too high reulting normal force $F_{\Sigma Nn+1}$ towards the conveyor track 15 as long as the retaining force does not fall below the specified retaining force $F_{Hn+1min}$. In this case too, the load on the guide elements 9 is relieved and running noises are reduced.

In a known manner, a forward-driving force $F_{vn}$, which moves the transport units Tn in the forward direction V along conveyor segment TSk, that is to say along the conveyor track 15, is generated by the closed or open-loop control of the electrical stator current $i_A$ of the drive coils 7, 8 for each of the transport units Tn. In doing so, it is of course only necessary to energize the drive coils 7, 8 which currently interact with a transport units Tn, in particular the drive magnets 4, 5 thereof. At the same time, the generated forward-driving forces do not, of course, have to be the same for the individual transport units Tn. And of Course the stator currents $i_A$ impressed in the respective drive coils 7, 8 do not have to be of the same magnitude. Each of the transport units Tn can therefore be moved along the conveyor track 15 individually (position, velocity, acceleration) and independently (apart from the avoidance of possible collisions) of the other transport units Tri. As this basic principle of a long stator linear motor is sufficiently well known, this is not addressed in more detail here.

A conveyor segment TSk or the drive coils 7 arranged thereon can be controlled for this purpose by a segment control unit 11k, as described by way of example in FIG. 5. A transport unit Tn, which is located in a conveyor segment TSk, is therefore controlled by the associated segment control unit 11k. Essentially, this means that the segment control unit 11k controls the drive coils 7 of the associated conveyor segment TSk such that the transport unit Tn located thereon is moved along the conveyor segment TSk by the forward-driving force $F_{vn}$ in the required manner (position, velocity, acceleration). In doing so, it is of course possible for a plurality of transport units to also be moved along a conveyor segment TSk at the same time. If a transport unit Tn moves from a conveyor segment TSk into the next following conveyor segment TSk+1, the control of the transport unit Tn is also transferred in an orderly manner to the segment control unit 11k+1 of the next following conveyor segment TSk+1. The movement of the transport unit Tn through the conveyor installation 1 can be monitored and controlled by a higher-level system control unit 10, which is connected to the segment control units 11k. The system control unit 10 controls the movement of the individual transport units Tn through the conveyor installation 1, for example, by means of position setpoints (setpoint values for the control). For this purpose, the current position of the transport unit Tn is of course measured in a suitable and known manner and transferred to the system control unit 10 and/or the segment control unit 11k.

However, the conveyor track 15 does not of course have to be formed by individual conveyor segments TSk, but rather a continuous design can also be realized. Likewise, only a single segment control unit 11k, which controls all drive coils 7, can be provided. The segment control units 11k could also be integrated into the system control unit 10.

Figure 6:
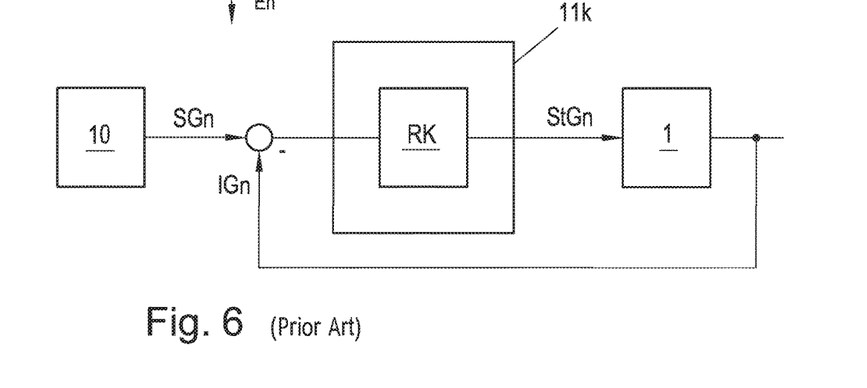
FIG. 6 to 9 show embodiments of a control for moving the transport unit.

However, drive coils 7, 8 arranged on both sides (if present) do not have to be energized simultaneously by impressing a stator current $i_A$ to move the transport unit Tn. Basically, it is sufficient when the forward-driving force $F_{Vn}$ acting on the transport unit Tn in order to move it is generated only by means of the drive coils 7 or 8 on one side and the drive magnets 4 or 5 on the associated side of the transport unit Tn. On track sections of the conveyor track where a large forward-driving force $F_{Vn}$ is required, e.g, in the case of an incline, a heavy load or in regions of acceleration of the transport unit Tn, the drive coils 7, 8 on both sides (if present) can be energized (e.g. conveyor section A9 in FIG. 1), whereby the forward-driving force $F_{Vn}$ can be increased. Likewise, it is conceivable that, in certain conveyor sections of the conveyor track, the guide structure 6 is only fitted on one side, or that, in. certain conveyor sections, although the guide structure 6 is fatted on both sides, drive coils 7, 8 are only fitted on one side. This is also indicated in FIG. 1 where track sections are shown with guide structure 6 on both sides and track sections with guide structure 6 on only one side, The control of a transport unit Tn of a long stator linear motor in the forward direction V is well known and is explained briefly with reference to FIG. 6. In each time step of the control, e.g. every 1 ms, a setpoint value SIGn, for example a setpoint position $p_{soll}$ and/or a setpoint velocity $v_{soll}$, is set for the transport unit In by a system control unit 10. A current actual value IGn, for example an actual position $p_{ist}$ and/or an actual velocity $v_{ist}$, of the transport unit Tn is determined. The actual value IGn can be measured by means of suitable sensors, can be calculated from other known variables, for example baSed on a model of the movement of the transport unit Tn, or can be estimated in an observer. The difference between the setpoint value SGn and the actual value IGn is fed to a controller Rk in the appropriate segment control unit 11k which calculates therefrom, based on the implemented control law (e.g. a PI controller or a PID controller), a manipulated variable StGn, for example a coil voltage to be applied to the acting drive coils 7, 8 to energize the drive coils 7, 8, which is applied to the controlled system, here the conveyor installation 1. If a plurality of transport units Tn are moved through a conveyor segment TSk simultaneously, then a plurality of controllers Rk, one per transport unit Tn, e.g. in the associated segment control unit 11k, can be active independently of one another.

Figure 7:
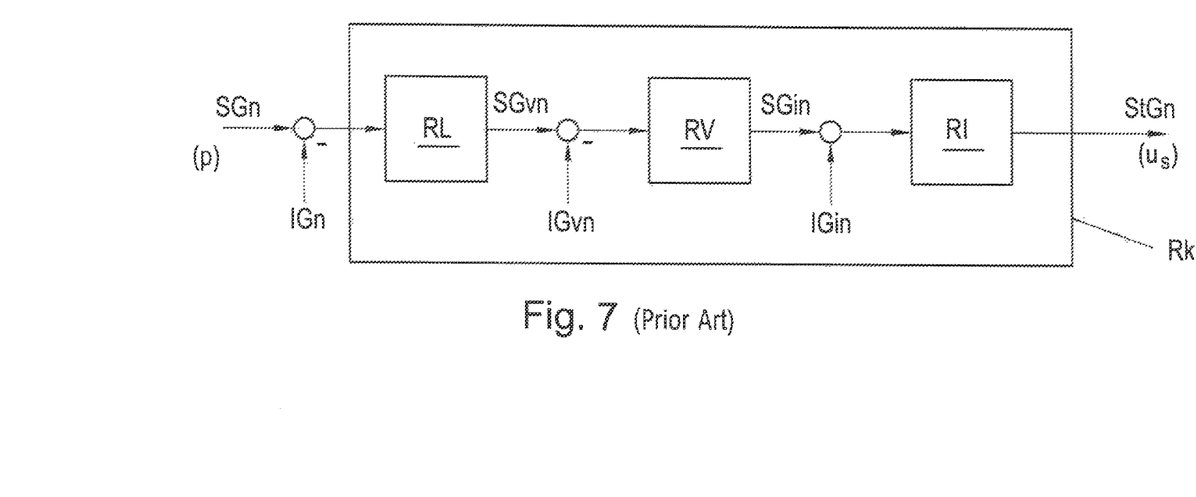

The controller Rk is often, but not necessaril designed as a controller cascade, which is explained with reference to FIG. 7 with a position p as setpoint value SGn. The difference between the setpoint value SGn and the actual value IGn (actual position) is fed to a position controller RL, which calculates a velocity $v_n$ of the transport unit Tn to be set as a setpoint value SGvn for a velocity controller RV. The difference between this setpoint value SGvn and an actual value IGvn (here an actual velocity) is fed to the velocity controller RV, which calculates a required forward-driving-three-forming current component $i_{Anq}$ of the stator current $i_A$ as a setpoint value SGin for a current controller RI. The difference between the setpoint value SGin and an actual value IGin (here an actual current for example) is fed to the current controller RI, which calculates a coil voltage $u_S$ as the manipulated variable StGn.

As is known, the forward-driving force required for the movement of the transport unit Tn is formed from the forward-driving-force-forming current component $i_{Anq}$ (q-component) of the stator current $i_{An}$. The normal force $F_{Nn}$ which is not used for forward movement is formed from a normal-force-forming current component $i_{And}$ (d-component) of the stator current $i_{An}$. The stator current $i_{An}$ is therefore a current vector with a q- and a cl-component, wherein, previously, the d-component has usually been set to zero or only used to trigger a track switch, as described, for example, in EP 3 109 998 A1 mentioned in the introduction. The stator current $i_{An}$ corresponds to the vectorial summated current of all coil currents $i_S$ of the drive coils 7 (or 8) acting on the transport unit Tn on one side.

The forward-driving-force-forming current component $i_{Anq}$ is therefore sufficient for the normal forward movement of the transport unit Tn. Of course, in an electric motor, and therefore also in a long stator linear motor, a plurality of drive coils 7, 8 act simultaneously to move the transport unit Tn. Under the assumption that there is no d-component, the forward-driving-force-forming current component $i_{Anq}$ corresponds to the vectorial summated current of all coil currents $i_S$ of the drive coils 7 (or 8) acting on the transport unit Tn on one side. The forward-driving-force-forming current component $i_{Anq}$ calculated in the controller Rk must therefore be apportioned between the actually acting drive coils 7. In doing so, the drive coils 7 which interact with the transport unit Tn at any time is known based on the known position of the transport unit Tn and the known design of the conveyor track.

Figure 8:
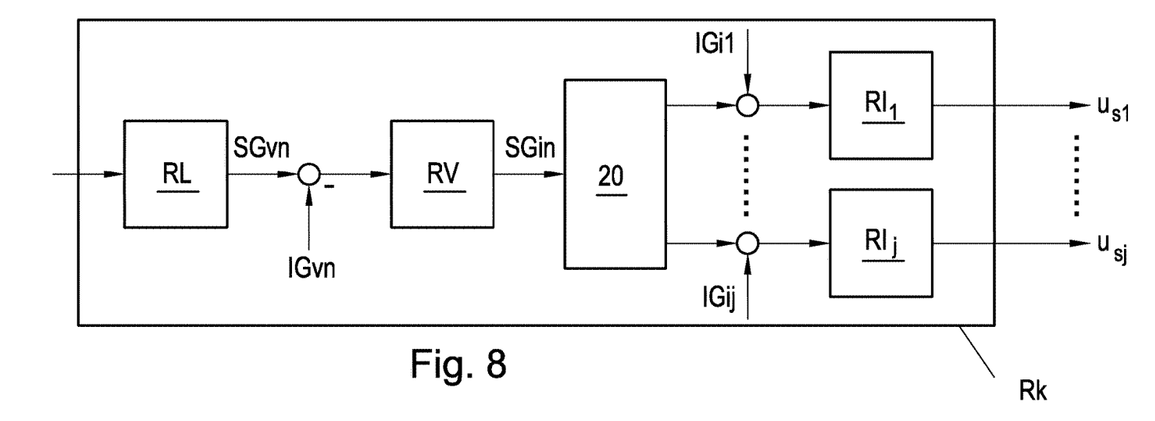
Figure 9:
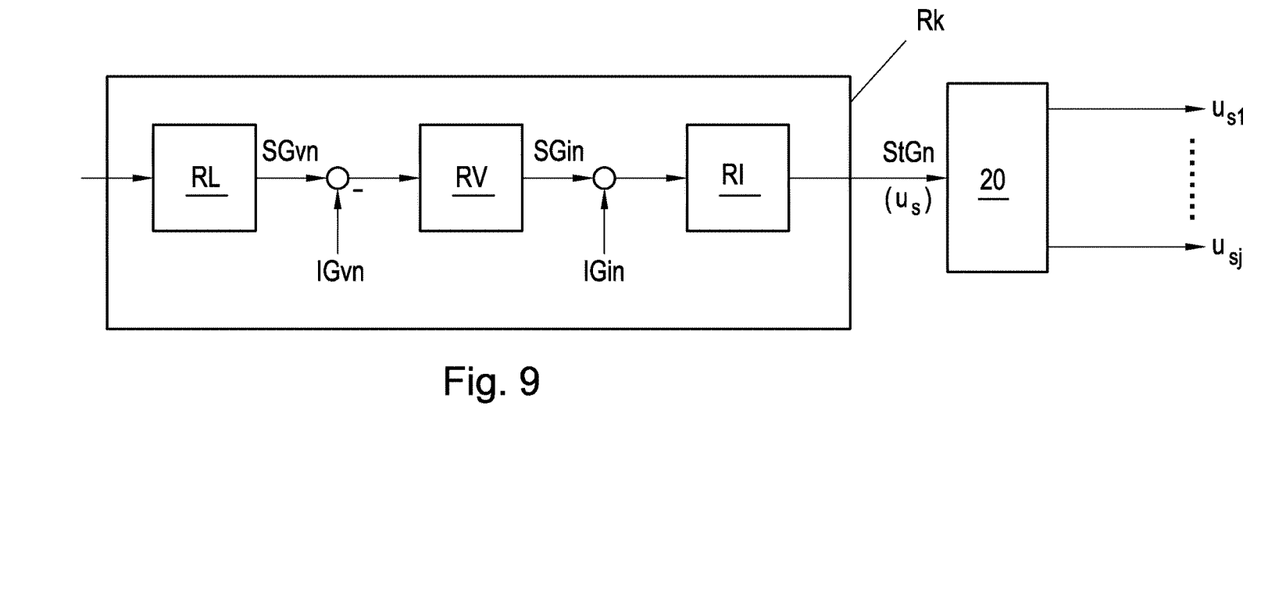

For example, the setpoint value SGin (that is to say a current) for the current controller RI which is calculated by the velocity regulator RV can be apportioned in a converter unit 20 between the acting j drive coils 7 (e.g. by means of the analogously applied inverse Park transform), as shown in FIG. 8. The apportioned setpoint values SGin are then fed to j individual current controllers RI for each of the acting drive coils 7, which then calculate the j coil voltages $u_{sj}$ to be applied to the individual drive coils 7. Alternatively, however, the setpoint value StGn (the coil voltage $u_S$) calculated by the current controller RI can also be apportioned subsequently, as shown in FIG. 9.The converter unit 20 can also be separate from the controller Rk.

The individual coil voltages $u_{sj}$ of the acting j drive coils 7 (or 8) can then be applied to the drive coils 7 by the drive coil electronics (not shown).

According to the invention, the control of the transport unit Tn is now enhanced in that not only the forward-driving-force-forming current component $i_{Anq}$ is controlled as before, but also the normal-force-forming current component $i_{And}$ of the stator current $i_A$. The objective here is to control the resulting normal force $F_{\Sigma Nn}$ (perpendicular to the forward-driving force $F_{Vn}$) acting on the transport unit Tn in ongoing operation of the conveyor installation 1 as described above and independently of the forward-driving force $F_{Vn}$. The control of the normal force $F_{Nn}$ is only interesting per se on track sections on which drive coils 7 (or 8) are arranged on only one side (viewed in the forward direction V) of the conveyor track 15 (e.g. A4 in FIG. 1). On track sections with drive coils arranged on both sides (e.g. A9 in FIG. 1), the acting normal forces partially cancel one another (in particular the magnetic forces $F_{Mn}$) and the resulting normal force can also be absorbed by guide elements 9 on both sides, as a result of which the mechanical loads are also halved. Furthermore, a transport unit Tn on such a section is also unable to fall off the conveyor track 15.

For the control of the normal force $F_{Nn}$, it is necessary to know the forces acting in the normal direction N on the transport unit Tn at a particular position of the conveyor track 15. The external force $F_{En}$ can be determined, for example, by means of suitable sensors. For example, an acceleration in the normal direction N can be measured by means of an acceleration sensor on the transport unit Tn, from which a dynamic force as an external force $F_{En}$ can be calculated as the product of the known mass of the transport unit Tn (including load) and the acceleration in the normal direction N. However, a model can also be provided in order to calculate the external force $F_{En}$ as a function of known variables. For example, a model could determine a centrifugal force as the external force $F_{En}$ from a known radius of curvature of the conveyor track 15 (e.g, a bend), the velocity in the forward direction V and the mass of the transport unit Tn (including load, which can likewise be assumed to be known). However, the external force $F_{En}$ can also be configured, for example, when planning the conveyor installation 1, that is to say a certain occurring external force $F_{En}$ can be assumed, calculated, simulated etc, at certain positions of the conveyor track 15 and stored for this position. The movement of the transport units Tn is normally also planned when planning the conveyor installation 1, whereby the external forces $F_{En}$ occurring at certain track sections can be estimated and stored for controlling the normal force $F_{Nn}$.

The acting magnetic force $F_{Mn}$ can likewise be assumed to be known. When the design of the conveyor installation 1 is known, the magnetic force $F_{Mn}$ can be measured, simulated or calculated for example.

The specified required retaining force $F_{Hnmin}$ or, equally, a resulting desired normal force $F_{\Sigma Nnsoll}$ to be set, can be used as the setpoint value for the controller, and the normal force $F_{Nn}$ can be set by a controller Rk to ensure that the resulting normal force $F_{\Sigma Nn}$ is at all times or at any position of the conveyor track 15 equal to or at least does not fall below the specified retaining force $F_{Hnmin}$. In this case, the controller Rk would also have to know the magnetic force $F_{Mn}$ and, if appropriate, also the external force $F_{En}$, which must be fed to the controller Rk or determined in the controller Rk. As an equivalent to this, a setpoint normal force $F_{Nnsoll}$, which is to be set in order to achieve the specified retaining force $F_{Hnmin}$, can also be fed to the controller Rk as the setpoint value. In this ease, the magnetic force $F_{Mn}$ and, if appropriate, the external force $F_{En}$, are taken into account in a higher-level unit, for example in the system control unit 10 or a segment control unit 11k. In the simplest case, a setpoint normal force $F_{Nnsoll}$, which is sufficient to ensure that the specified retaining force $F_{Hnmin}$ is maintained in at least one track section, can also be specified based on experience (for example based on experiment). In doing so, the magnetic force $F_{Mn}$ and, if appropriate, the external force $F_{En}$ would not have to be known, as the system can control directly to the setpoint normal force $F_{Nnsoll}$. The controller Rk can be integrated, for example, into a segment control unit 11k, which is assumed in the following without restricting generality. Further, it is assumed in the following that a setpoint normal force $F_{Nnsoll}$ is fed to the controller Rk as the setpoint value.

Figure 10:
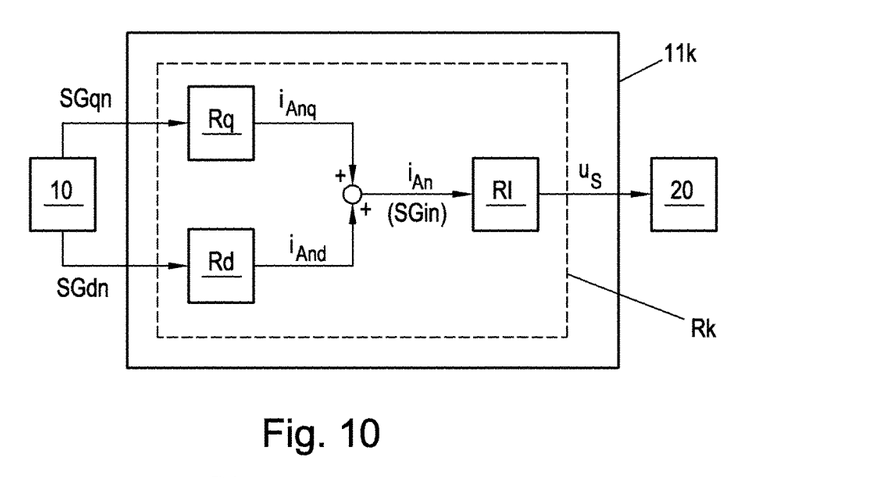
FIG. 10 shows an enhancement of the control for the movement of the transport unit with a controller for controlling the normal force.

The controller Rk for controlling the transport unit Tn is now divided into a controller Rq for controlling the forward-driving force $F_{Vn}$ and a controller Rd for controlling the normal force $F_{Nn}$, as shown in FIG. 10. Here, the controller Rq corresponds to a conventional controller for the forward-driving force $F_{Vn}$, for example as described above with reference to FIG. 6 to 9. However, the specific implementation of the controller Rq is irrelevant for the inventive control of the normal force $F_{Nn}$. As previously, a setpoint value SGqn for the control of the forward-driving force $F_{Vn}$ with the controller Rq and, in addition, a setpoint value SGdn for the control of the normal force $F_{Nn}$ with the controller Rd is provided from a higher-level unit, for example the system control unit 10. The setpoint value SGdn for the control of the normal force $F_{Nn}$ is preferably a setpoint normal force $F_{Nsoll}$ or, equivalent thereto, a setpoint magnetic flux $\psi_{nsoll}$ in the air gap. The forward-driving-force-forming current component $i_{Anq}$ and normal-force-forming current component $i_{And}$ calculated here are transferred together as a current vector of the stator current $i_{An}$ to the current controller RI, which in turn calculates the coil voltages $u_{Sj}$ to be applied. As described above, the converter unit 20 can be provided before or after the current controller RI.

Figure 11:
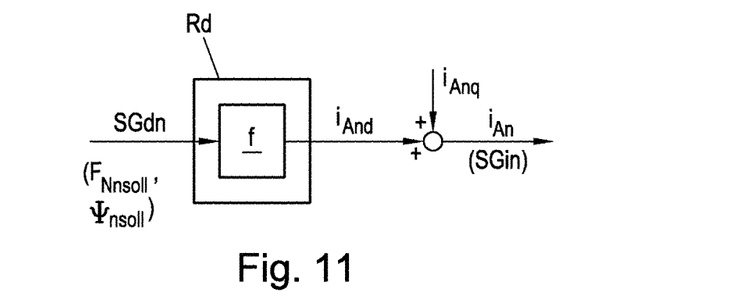
FIG. 11 shows an embodiment according to the invention of the controller for controlling the normal force.

In the simplest case, the known relationship f between the setpoint normal force $F_{Nnsoll}$ or, equivalent thereto, the setpoint magnetic flux $\psi_{nsoll}$ and the normal-force-forming current component $i_{And}$ can be used to control the normal force $F_{Nn}$ for a transport unit Tn in a kind of a feedforward control, as shown in FIG. 11. A setpoint value for the normal-force-forming current component $i_{Andsoll}$ could also directly be specified in the same way. In this case, the functional relationship f would be given by the unit function. As a result of the specified and known design of the conveyor installation 1, the relationship f between the normal force $F_{Nn}$ (or the flux $\psi$) and the norsnal-force-forming current component $i_{And}$ can be determined (for example calculated, simulated or measured) in advance and can be assumed to be known. This relationship f is implemented in the controller Rd, for example as a mathematical function or model. A simple relationship with the known inductance $L_{Sd}$ in the normal direction N can, for example, be written in the form $$i_{And} = \frac{\psi_{nsoll}}{L_{Sd}}$$

Figure 12:
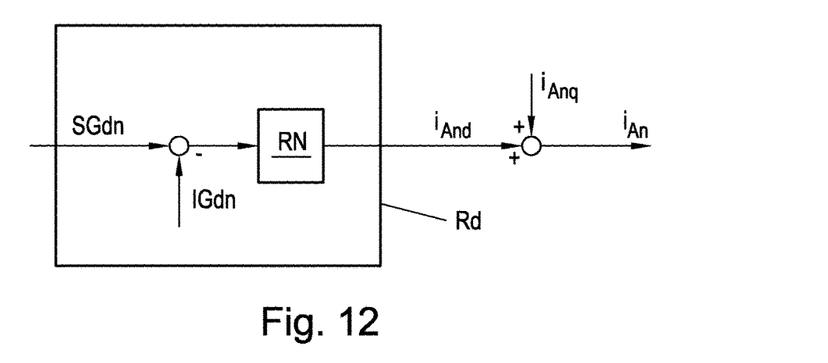
FIG. 12 shows a further embodiment according to the invention of the controller for controlling the normal force.

A feedback normal force controller RN (for example a simple PI or PID controller), which calculates the required normal-force-forming current component $i_{And}$ from the specified setpoint value SGdn (setpoint normal force $F_{Nnsoll}$ or setpoint magnetic flux $\psi_{nsoll}$ or also a resulting setpoint normal force $F_{\Sigma Nnsoll}$) for the control of the normal force $F_{Nn}$, can also be implemented instead of a simple feedforward control, as shown in FIG. 12. The actual value IGdn required for this, for example a magnetic flux $\psi$ currently acting in the air gap, can be measured or estimated in an observer from other measured variables (such as the actual coil current and the actual coil voltage for example).

Based on the known design of the conveyor track and the transport unit Tn, the magnetic flux $\psi_x$ acting as a result of the drive magnets 4 can be determined in advance as a function of the position x of the transport unit Tn relative to the conveyor track 15 (see FIG. 2) over the length of the transport unit Tn (or over the length of the drive magnets 4, 5). For example, this characteristic of the magnetic flux $\psi_x$ can be measured in advance (e.g. by measuring the induction voltage (EMF voltage) and integration thereof), simulated (e.g. in an FEM simulation or by a reluctance network) or can also be estimated by a flux observer. An example characteristic of the magnetic flux $\psi_x$ is showing FIG. 13.

Figure 13:
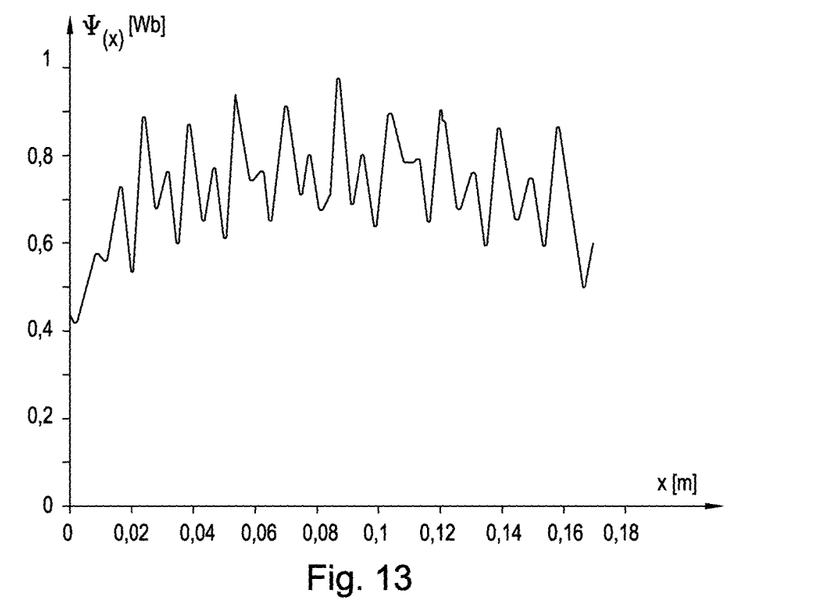
FIG. 13 shows an exemplary characteristic of the magnetic flux as a function of the position relative to the conveyor track.
Figure 14:
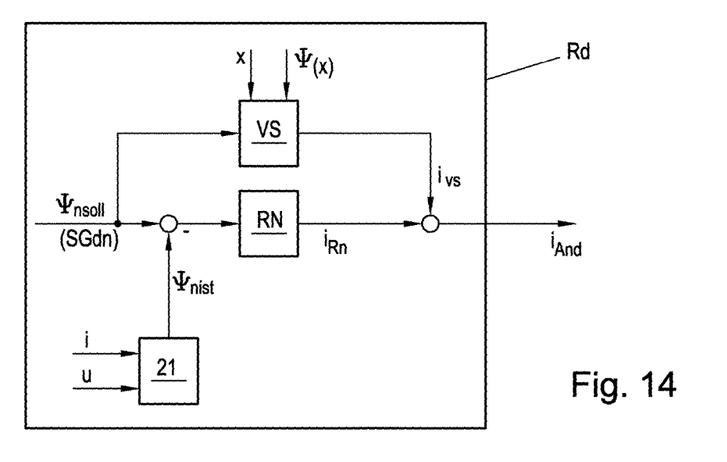
FIG. 14 shows a further embodiment of the controller for controlling the normal force with feedforward control.

This characteristic can be stored, for example in the controller Rk or in the segment control unit 11k, and can be used in the controller Rd in order to implement a pilot control for the normal force controller RN. For example, a simple pilot control law can be implemented in the form $$i_{VS}(x) = \frac{\psi_{nsoll} - \Psi(x)}{L_{Sd}}$$

with the specified desired flux $\psi_{nsoll}$, the flux characteristic $\psi(x)$ as a function of the position x of the transport unit Tn (which can be taken from the characteristic as in FIG. 13) and the known inductance $L_{Sd}$ in the d-direction. An alternative suitable pilot control law can, of course, also be realized, even without the characteristic as in FIG. 13. The controller Rd with pilot control VS could then be implemented as shown in FIG. 14.

Here, the setpoint magnetic flux $\psi_{nsoll}$ is specified as the setpoint value SGdn. The setpoint magnetic flux $\psi_{nsoll}$ is fed to the pilot control VS, which calculates a pilot current $i_{VS}$ therefrom, for example as shown above. In this exemplary embodiment, the actual flux $\psi_{nist}$, as actual value IGdn, is estimated in an observer 21. The control difference between setpoint magnetic flux $\psi_{nsoll}$ and the actual flux $\psi_{nist}$ is fed to the normal force controller RN, which only has to correct small control deviations via the control current $i_{RN}$.

When the characteristic of the magnetic flux as a function of the position is taken into account in the pilot control VS, then this flux variation is compensated for by the pilot control. This also enables variations in the normal force associated therewith to be compensated for in a simple manner, which can further improve the smooth running of the transport unit Tn.

The invention claimed is:

1. A method for controlling a normal force ($F_{Nn}$) acting on a transport unit of a conveyor installation in the form of a long stator linear motor on a track section of a conveyor track defined by the conveyor installation, on which track section drive coils of the long stator linear motor are provided on only one side of the transport unit and the transport unit is retained on the conveyor track on this side by guide elements, wherein a number of drive magnets on the transport unit interacts with a number of drive coils for generating the normal force ($F_{Nn}$) and the normal force ($F_{Nn}$) is controlled with a controller for controlling the normal force ($F_{Nn}$), wherein the controller determines a normal-force-forming current component of the drive current of the drive coils interacting with the transport unit so that a resulting normal force ($F_{\Sigma Nn}$) acting on the transport unit as the sum of the normal force ($F_{Nn}$), a magnetic force ($F_{Mn}$) in a normal direction caused by the drive magnets, and an external force ($F_{En}$) in the normal direction acting on the transport unit corresponds at least to a specified retaining force ($F_{Nnmin}$) in the normal direction.

2. The method according to claim 1, wherein the controller for controlling the normal force ($F_{Nn}$) determines the normal-force-forming current component of the drive current from a known functional relationship between the normal-force-forming current component of the drive current and a setpoint value.

3. The method according to claim 2, wherein a setpoint flux is specified as the setpoint value, and the normal-force-forming current component is calculated as a quotient of the setpoint flux and a known inductance in the normal direction.

4. The method according to claim 1, wherein, in the controller for controlling the normal force ($F_{Nn}$), the normal-force-forming current component is determined from a difference between a setpoint value and an actual value by way of a normal-force controller.

5. The method according to claim 1, wherein, in the controller for controlling the normal force (FNn), a pilot current is determined by a pilot control from a setpoint value, and a control current is determined by a normal-force controller from a difference between the setpoint value and an actual value, and the normal-force-forming current component is determined as a sum of the pilot current and the control current.

6. The method according to claim 5, wherein the pilot current is determined based on a known relationship of a position of the transport unit relative to the conveyor track.

7. The method according to claim 1, wherein a forward-force-forming current component is determined in a controller for controlling a forward force ($Fv_n$) of the transport unit and a drive current of the drive coils interacting with the transport unit is determined as a vectorial sum of the forward-force-forming current component and the normal-force-forming current component and the drive current is converted into coil voltages which are applied to the drive coils interacting with the transport unit.

* * * * *